US008511079B2

(12) United States Patent
Stoltz et al.

(10) Patent No.: US 8,511,079 B2
(45) Date of Patent: Aug. 20, 2013

(54) PIECEWISE VARIABLE DISPLACEMENT POWER TRANSMISSION

(75) Inventors: Thomas J. Stoltz, Allen Park, MI (US); G. Clark Fortune, Farmington Hills, MI (US); Mihai Dorobantu, Eden Prairie, MN (US)

(73) Assignee: Eaton Corporation, Cleveland, OH (US)

( * ) Notice: Subject to any disclaimer, the term of this patent is extended or adjusted under 35 U.S.C. 154(b) by 916 days.

(21) Appl. No.: 12/639,528

(22) Filed: Dec. 16, 2009

(65) Prior Publication Data

US 2011/0142632 A1  Jun. 16, 2011

(51) Int. Cl.
*F16H 61/444* (2010.01)

(52) U.S. Cl.
USPC .......................................................... 60/398

(58) Field of Classification Search
USPC ....................................... 60/398; 290/44, 55
See application file for complete search history.

(56) References Cited

U.S. PATENT DOCUMENTS

| | | | |
|---|---|---|---|
| 4,503,673 A * | 3/1985 | Schachle et al. | 60/398 |
| 4,936,095 A | 6/1990 | Ross et al. | |
| 4,951,462 A | 8/1990 | Graf | |
| 5,108,267 A | 4/1992 | Horst | |
| 5,136,845 A | 8/1992 | Woodley | |
| 5,503,534 A | 4/1996 | Rhody | |
| 5,592,818 A | 1/1997 | Haag et al. | |
| 6,698,197 B1 | 3/2004 | Peterson | |
| 6,911,743 B2 * | 6/2005 | Ishizaki | 290/55 |
| 6,971,232 B2 | 12/2005 | Singh | |
| 7,255,193 B2 | 8/2007 | Miller et al. | |
| 7,418,820 B2 * | 9/2008 | Harvey et al. | 60/398 |
| 7,863,767 B2 * | 1/2011 | Chapple et al. | 60/398 |
| 2006/0210406 A1 | 9/2006 | Harvey et al. | |

FOREIGN PATENT DOCUMENTS

| | | |
|---|---|---|
| EP | 1677000 | 7/2006 |
| EP | 1677000 A2 * | 7/2006 |
| GB | 1084873 | 9/1967 |
| WO | 2008113699 | 9/2008 |
| WO | WO 2008113699 A2 * | 9/2008 |
| WO | 2009102134 | 8/2009 |
| WO | WO 2009102134 A2 * | 8/2009 |

OTHER PUBLICATIONS

International Search Report; Corresponding PCT Application No. PCT/IB2010/003259 (filed Dec. 15, 2010); Authorized Officer CALAMA, Areal (6 pages).
Written Opinion; Corresponding PCT Application No. PCT/IB2010/003259 (filed Dec. 15, 2010); Authorized Officer CALAMA, Areal (10 pages).

* cited by examiner

*Primary Examiner* — Thomas E Lazo
(74) *Attorney, Agent, or Firm* — Squire Sanders (US) LLP (57) ABSTRACT

In one embodiment, a hydraulic circuit has an input shaft, at least one positive displacement hydraulic pump, a plurality of positive displacement hydraulic motors, and at least one fluid line operatively connecting the at least one positive displacement hydraulic pump to the positive displacement hydraulic motors. In operation, the at least one positive displacement hydraulic pump is placed in an operative condition. At least one of the positive displacement hydraulic motors is also placed in an operative condition. A flow rate of fluid in the fluid line is measured, and the remaining positive displacement hydraulic motors are switched between an operative condition and a bypass condition according to the measured flow rate of the fluid.

20 Claims, 5 Drawing Sheets

PIECEWISE VARIABLE DISPLACEMENT POWER TRANSMISSION

FIELD OF INVENTION

The present application relates to a power transmission system. More particularly, the present application relates to a hydraulic power transmission system.

BACKGROUND

In known hydraulic transmission systems, a prime mover drives a pump which converts power into hydraulic pressure. The hydraulic pressure is then transmitted to a hydraulic motor which converts the pressure back into power, which may then be used to power a load. In a closed loop circuit, the hydraulic fluid returns directly to the pump through a return line. In an open loop circuit, the hydraulic fluid returns to a reservoir, which feeds the pump. The pump may be a variable displacement pump and the motor may be a variable displacement motor.

In the context of prior art wind turbines, a rotor is the prime mover and the load is an electrical generator.

SUMMARY

In one embodiment, a hydraulic circuit has an input shaft, at least one positive displacement hydraulic pump, a plurality of positive displacement hydraulic motors, and at least one fluid line operatively connecting the at least one positive displacement hydraulic pump to the positive displacement hydraulic motors. In operation, the at least one positive displacement hydraulic pump is placed in an operative condition. At least one of the positive displacement hydraulic motors is also placed in an operative condition. A flow rate of fluid in the fluid line is measured, and the remaining positive displacement hydraulic motors are switched between an operative condition and a bypass condition according to the measured flow rate of the fluid.

BRIEF DESCRIPTION OF THE DRAWINGS

In the accompanying drawings, structures are illustrated that, together with the detailed description provided below, describe exemplary embodiments of the claimed invention.

In the drawings and description that follows, like elements are identified with the same reference numerals. The drawings are not to scale and the proportion of certain elements may be exaggerated for the purpose of illustration.

DETAILED DESCRIPTION

Figure 1:
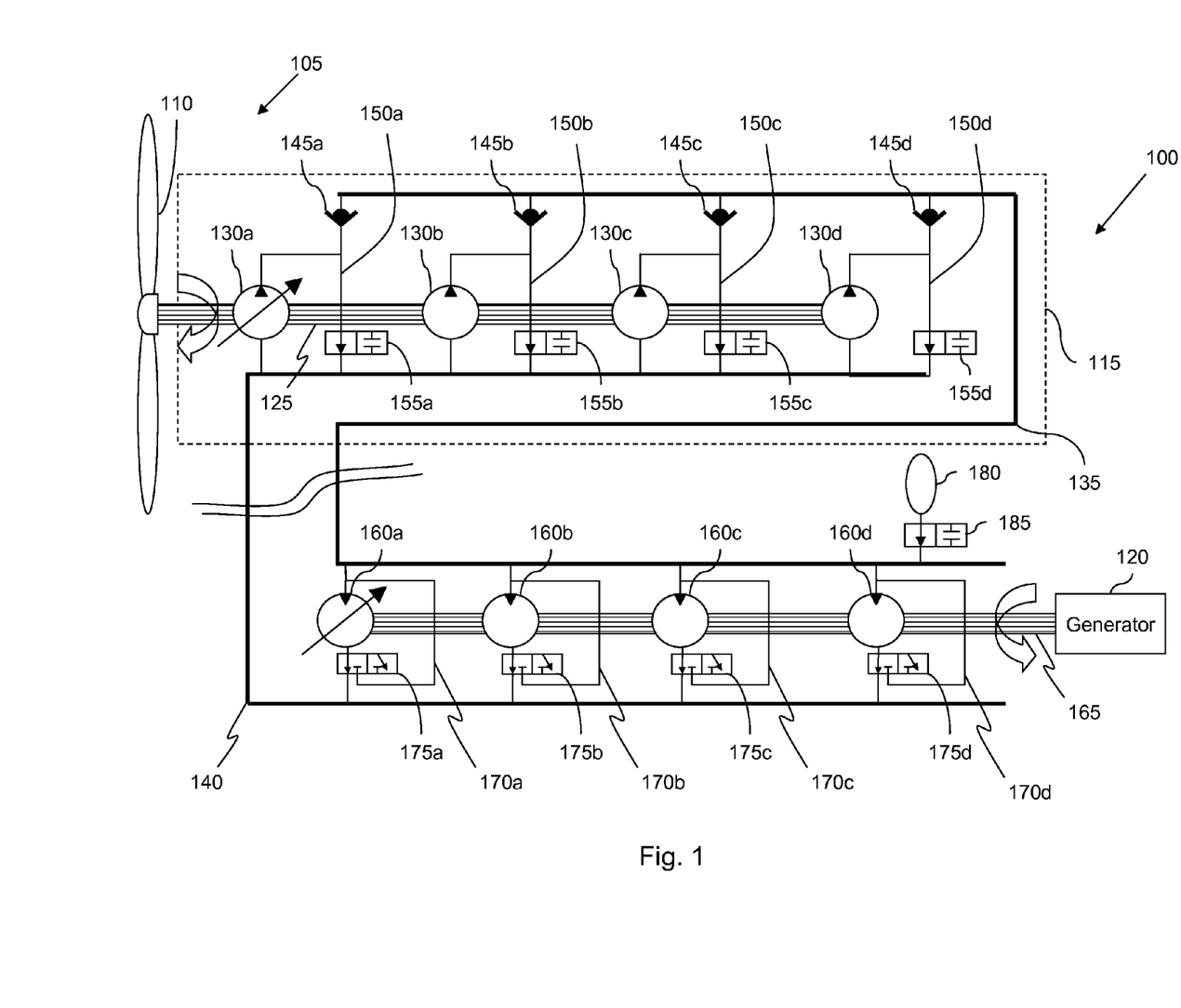
FIG. 1 is a schematic illustration of one embodiment of a power transmission system 100 having multiple pumps and multiple motors.

FIG. 1 is a schematic illustration of one embodiment of a power transmission system 100. The power transmission system 100 is shown as being employed with a wind turbine 105 having a rotor 110 and a nacelle 115. The power transmission system 100 is operatively connected to a generator 120. The rotor 110 and nacelle 115 may be of any design.

While FIG. 1 shows a horizontal axis wind turbine, one skilled in the art would understand that the power transmission system 100 may be employed with a vertical axis wind turbine. Moreover, it should be understood that the power transmission system 100 may be employed with hydroelectric turbines or in construction equipment, vehicles, aircraft, spacecraft, injection molding machinery, material handling machinery, or other machinery. In all cases, the power transmission system 100 may be employed in a work circuit of a device. Additionally, in vehicles, the power transmission system 100 may be employed on a driveline to allow a vehicle to switch between 2-wheel drive and 4-wheel drive.

The rotor 110 is operatively connected to a first shaft 125, such that rotation of the rotor 110 causes the first shaft 125 to rotate. In turn, a plurality of positive displacement hydraulic pumps 130a-d are connected serially along the first shaft 125, such that rotation of the first shaft 125 causes the pumps 130a-d to operate. The pumps 130a-d are also fluidly connected in parallel to a high pressure fluid line 135 and a low pressure return line 140.

The pumps 130a-d are sized such that, collectively, they can maximize the fluid flow in the high pressure fluid line 135, and that their combined displacement is proportional to the maximum output of the generator 120. The pumps 130a-d may be any combination of piston pumps, axial flow pumps, radial flow pumps, vane pumps, gear pumps, gear pumps, centrifugal pumps, roller pumps, or other know pumps. In the illustrated embodiment, pump 130a is a variable displacement pump and the remaining pumps 130b-d are fixed displacement pumps. In alternative embodiments, any combination of fixed and variable pumps may be employed, including all fixed or all variable pumps.

In one embodiment, one or more of the pumps 130a-d may be full authority pumps, i.e. reversible pumps/motors with full and partial cylinder deactivation. Examples of full authority machines are described in U.S. Pat. No. 4,767,292 issued to Kinder and NCFP 105-10.1 "Design of a Virtually Variable Displacement Pump/Motor": Michael Nieling, Frank J. Fronczak, and Norman H. Beachley, from IFPE—International Fluid Power Symposium, Mar. 15-19, 2005, Las Vegas.

While FIG. 1 shows four pumps 130a-d connected to the rotor 110 by a first shaft 125, it should be understood that any number of pumps and any number of shafts may be employed. For example, in one embodiment, the power transmission system 100 employs 75 pumps, each pump having 100 horsepower.

Each of the pumps 130a-d is fluidly connected to the high pressure fluid line 135 through an associated valve 145a-d. In the illustrated embodiment, the associated valves 145a-d are check valves that prevent fluid in the high pressure fluid line 135 from flowing in a reverse direction. In alternative embodiments (not shown), the associated valves may be two position directional valves, electro-hydraulic valves, ball valves, 3-way valves or other valves.

In the illustrated embodiment, each of the pumps 130a-d is also fluidly connected to an associated pump bypass line 150a-d. Each pump bypass line 150a-d is fluidly connected to an associated pump control valve 155a-d, which may be switched between an open state and a closed state.

As shown in FIG. 1, each pump control valves 155a-d is shown as a normally open directional control valve with two ports and two finite conditions. In an alternative embodiment (not shown), the control valves may be normally closed directional control valves with two ports and two finite conditions. In other alternative embodiments (not shown), electro-hydraulic servo valves, proportional directional control valves, or other control valves may be employed. In yet another alternative embodiment (not shown), digital hydraulic valves may be employed. In such an embodiment, pulses created by the digital hydraulic valves would modulate the flow, efficiently varying the flow from the pumping portion to the motor portion of the transmission system. The digital valves may be operated in conjunction with an accumulator to smooth the flow created by the pulses.

In one embodiment, the pump control valves 155a-d are operatively connected to and controlled by an electronic control system (not shown). The electronic control system may include various sensors (not shown) to monitor the rotation speed and torque of the rotor 110 and first shaft 125, the flow rate and pressure of fluid in the high pressure fluid line 135 and low pressure return line 140, and the usage and wear of various other components of the power transmission system 100. The electronic control system may also include logic configured to switch the pump control valves 155a-d between an open state and a closed state according to data received from the sensors. Where variable displacement pumps are employed, the electronic control system may also include logic configured to control the displacement of the pumps.

In an alternative embodiment, the control valves 155a-d can be operatively connected to and controlled by a hydraulic control system (not shown). For example, the control valves 155a-d may be controlled hydraulically and switched between an open and a closed state based on the pressure of fluid in the high pressure fluid line 135 and low pressure return line 140. Similarly, where variable displacement pumps are employed, they may also be controlled hydraulically. In such an embodiment, an electronic control system may be omitted.

In accordance with hydrodynamic principles, fluid will flow from a high pressure location towards a low pressure location. Therefore, when a pump control valve 155a-d is in its open state, fluid will be pumped from its associated pump 130a-d through its associated pump bypass line 150a-d and associated control valve 155a-d to the low pressure return line 140. Therefore, when a pump control valve 155a-d is in its open state, its associated pump 130a-d may be described as being in a "bypass state" or a "bypass condition." When a pump 130a-d is in a bypass state or bypass condition, it does not pump fluid to the high pressure line 135 and thus does not increase the flow rate or pressure of the fluid in the high pressure line 135.

When a pump control valve 155a-d is in its closed state, fluid will be pumped from its associated pump 130a-d through its associated valve 145a-d to the high pressure fluid line 135. Therefore, when a pump control valve 155a-d is in its closed state, its associated pump 130a-d may be described as being in an "operatively connected state" or an "operative condition." When a pump 130a-d is in the operatively connected state or operative condition, it pumps fluid to the high pressure line 135 and thus increases the flow rate of the fluid in the high pressure line 135. As more pumps are put in their operatively connected states, the fluid flow rate through the high pressure line 135 increases.

Additionally, where variable displacement pumps are employed, the displacement of the pump may be lowered to 0% (or near 0%) displacement. A variable displacement pump at or near 0% displacement may be described as being in an "idle state" or "idle condition." In one embodiment, when a pump control valve 155a-d is in its open state and its associated pump 130a-d is a variable displacement pump, the pump 130a-d is put in an idle state.

In an alternative embodiment (not shown), where the pumps are variable displacement hydraulic pumps, the associated bypass line and control valve can be omitted. Instead of being bypassed, the pump may be simply put in an idle state. Because putting a pump in an idle state may have the same effect as putting a pump in a bypass state, a pump in an idle state may also be described as being in a "bypass state" or "bypass condition." Likewise, a pump that is not in an idle state and not otherwise in a bypass state may be described as being in an "operatively connected state" or an "operative condition."

With continued reference to FIG. 1, the power transmission system 100 further includes a plurality of positive displacement hydraulic motors 160a-d connected serially along a second shaft 165. The second shaft 165 is operably connected to the generator 120, such that rotation of the second shaft 165 powers the generator 120. The motors 160a-d are also fluidly connected in parallel to the high pressure fluid line 135 and the low pressure return line 140.

The motors 160a-d are sized such that, collectively, they can maximize the output to the generator 120, and that their combined displacement is proportional to the maximum output of the generator 120. The motors 160a-d may be a combination of gerotor motors, roller motors, radial piston motors, axial plunger motors, gear motors, vane motors, or other motors.

In one embodiment, one or more of the motors 160a-d may be full authority motors, i.e. reversible pumps/motors with full and partial cylinder deactivation. Examples of full authority machines are described in U.S. Pat. No. 4,767,292 issued to Kinder and NCFP 105-10.1 "Design of a Virtually Variable Displacement Pump/Motor": Michael Nieling, Frank J. Fronczak, and Norman H. Beachley, from IFPE—International Fluid Power Symposium, Mar. 15-19, 2005, Las Vegas.

While FIG. 1 shows four motors 160a-d connected to a single second shaft 165, it should be understood that any number of motors and any number of shafts may be employed. For example, in one embodiment, the power transmission system 100 employs 75 motors, each motor having 100 horsepower. While the number of pumps in the illustrated embodiment is equal to the number of motors, it should be understood that this is not a requirement. In one alternative embodiment, the power transmission system may include more pumps than motors. In another alternative embodiment, the power transmission system may include more motors than pumps.

In the illustrated embodiment, each motor 160a-d is fluidly connected to an associated motor bypass line 170a-d and an associated motor control valve 175a-d. Each motor control valve 175a-d may be switched between an open state and a closed state.

As shown in FIG. 1, each motor control valve 175a-d is shown as a normally open directional control valve with three ports and two finite conditions. In an alternative embodiment (not shown), the control valves may be normally closed directional control valves with three ports and two finite conditions. In other alternative embodiments (not shown), electro-hydraulic servo valves, proportional directional control valves, or other control valves may be employed. In yet another alternative embodiment (not shown), digital hydraulic valves may be employed.

In one embodiment, the motor control valves 175a-d are operatively connected to and controlled by an electronic control system (not shown) in the same manner described above with respect to the pump control valves 155a-d. Alternatively, the motor control valves 175a-d may be controlled hydraulically and switched between an open and closed state based on the pressure of fluid in the high pressure fluid line 135 and low pressure return line 140. In such an embodiment, an electronic control system may be omitted.

When a motor control valve 175a-d is in its open state, fluid will flow from the high pressure fluid line 135 through its associated motor bypass line 170a-d and motor control valve 175a-d to the low pressure return line 140, in accordance with hydrodynamic principles. Therefore, when a motor control valve 175a-d is in its open state, its associated motor 160a-d may be described as being in a "bypass state" or a "bypass condition." When a motor 160a-d is in a bypass state or bypass condition, it will not apply torque to the second shaft 165, and therefore will not contribute to the output of the generator 120.

When a motor control valve 175a-d is in its closed state, fluid is forced to flow through an entry port in the associated motor 160a-d, causing it to turn the second shaft 165 and thereby power the generator 120. The fluid will then exit the motor 160a-d and flow to the low pressure return line 140. Therefore, when a motor control valve 175a-d is in its closed state, its associated motor 160a-d may be described as being in an "operatively connected state" or an "operative condition." When a motor 160a-d is put in an operatively connected state or operative condition, fluid from the high pressure line 135 will flow through the motor causing the second shaft 165 to rotate and increasing the torque applied to the second shaft 165. As more motors are put in their operatively connected states, the torque on the second shaft 165 increases, which increases the power produced by the generator 120.

Additionally, where variable displacement motors are employed, the displacement of the motor may be lowered to 0% (or near 0%) displacement. A variable displacement motor at or near 0% displacement may be described as being in an "idle state" or "idle condition." In one embodiment, when a control valve 175a-d is its open state and its associated motor 160a-d is a variable displacement motor, the motor 160a-d is put in an idle state.

In an alternative embodiment (not shown), where the motors are variable displacement hydraulic motors, the associated bypass line and control valve may be omitted. Instead of bypassing the motor, the motor may be simply put in an idle state. Because putting a motor in an idle state may have the same effect as putting a motor in a bypass state, a motor in an idle state may also be described as being in a "bypass state" or "bypass condition." Likewise, a motor that is not in an idle state and not otherwise in a bypass state may be described as being in an "operatively connected state" or an "operative condition."

With continued reference to FIG. 1, the transmission system 100 also includes an accumulator 180 fluidly connected in parallel to the motors 160a-d. The accumulator allows energy to be stored during wind gusts, and provides a smoothing function. The accumulator 180 may be particularly useful in a digital implementation to smooth the pulse width modulation of the digital valves. The accumulator 180 is fluidly connected to the high pressure fluid line 135 through an accumulator control valve 185. In the illustrated embodiment, the accumulator control valve 185 is a normally open directional control valve with two ports and two finite positions. However, it should be understood that any type of control valve may be employed. In an alternative embodiment (not shown), the transmission system 100 may not include an accumulator.

Together, the pumps 130a-d, the high pressure fluid line 135, the motors 160a-d, the low pressure return line 140, and the bypass lines form a hydraulic circuit. In the illustrated embodiment, the low pressure return line 140 is directly connected to the motors 160 and the pumps 130, thus forming a closed loop hydraulic circuit. In an alternative embodiment (not shown), the power transmission system further includes a tank or reservoir as part of an open loop hydraulic circuit.

In the illustrated embodiment, the pumps 130a-d are all located in the nacelle 115 of the wind turbine 105, while the motors 160a-d, the accumulator 180, and the generator 120 are located externally from the nacelle 115. For example, the motors 160a-d, the accumulator 175, and the generator 120 may be located at ground level, providing easy access for maintenance or replacement. In an alternative embodiment, the entire transmission system may be located in the nacelle. In another alternative embodiment (not shown), none of the components of the transmission system are located in a nacelle. For example, with a vertical axis wind turbine the entire transmission system may be located at ground level.

The nacelle 115 may include at least one access port (not shown) proximal to at least one of the plurality of pumps 130a-d. The access port may have dimensions larger than dimensions of the pumps, thereby allowing the pumps to be removed from the nacelle for repair or replacement. In one embodiment, the pumps 130a-d are sufficiently lightweight to be removed and replaced from the nacelle 115 without the use of a crane.

If one or more of the pumps 130a-d malfunctions, the power transmission system 100 may be configured to put the malfunctioning pumps in a non-operational state, while at least one of the plurality of pumps remain in an operational state. Similarly, if one or more of the motors 160a-d malfunctions, the power transmission system 100 may be configured to place the malfunctioning motors in a non-operational state, while at least one of the plurality of motors remain in an operational state. These functions may be performed by an electronic control system (not shown), such as the electronic control system described above that is configured to operate the pump control valves 145a-d. To the extent a pump or motor is placed in a non-operational state, the power transmission system 100 may experience a soft degradation of performance, but will remain operable when one or more components fail.

In operation of the power transmission system 100, wind causes the rotor 110 to rotate, which causes the first shaft 125 to rotate at a certain speed and torque. The rotation of the first shaft 125 will cause the pumps 130a-d to pump fluid through the hydraulic circuit. Each pump in an operatively connected condition will pump fluid through its associated check valve 145a-d to the high pressure fluid line 135, while each pump in a bypass condition will pump fluid through its associated pump bypass line 150a-d and pump control valve 155a-d to the low pressure return line 140.

An increase in wind speed will increase the torque on the rotor 110 and the first shaft 125, while a decrease in wind speed will decrease the torque on the rotor 110 and first shaft 125. To a lesser extent, an increase in wind speed may also increase the speed at which the rotor 110 and the first shaft 125 rotate.

An electronic control system (such as the electronic control system described above) may be employed to activate or deactivate the pumps. One or more torque sensors (not shown) in communication with the electronic control system may be employed to monitor the torque produced by the first shaft 125. Alternatively, one or more pressure sensors (not shown) in communication with the electronic control system may be employed to monitor the pressure of the high pressure fluid line 135. Because the torque on the first shaft 125 may be inferred from the pressure of the high pressure fluid line 135, either measurement may be used.

Based on the received measurements, the pumps 130a-d may be selectively activated or switched between their bypass conditions and operatively connected conditions. For example, if the torque of the first shaft increases to a predetermined level, then one or more pumps may be activated to use the mechanical advantage provided by the torque increase. Similarly, if the torque of the first shaft decreases to a predetermined level, then one or more pumps may be deactivated to accommodate the torque decrease.

By selectively switching pumps between their bypass and operatively connected conditions and/or varying the displacement of a pump based on a change in torque applied to the first shaft 125, the fluid flow rate through the high pressure fluid line 135 will change. For example, if one or more pumps are activated to use the mechanical advantage provided by the torque increase, then the fluid flow rate through the high pressure fluid line 135 is increased. Similarly, if one or more pumps are deactivated to accommodate the torque decrease, then the fluid flow rate through the high pressure fluid line 135 is decreased.

To accommodate the changes to the fluid flow rate through the high pressure fluid line 135, the motors 160a-d may also be selectively activated or switched between their bypass and operatively connected conditions. The electronic control system described above may be employed to activate or deactivate the motors 160a-d. One or more fluid flow sensors (not shown) in communication with the electronic control system may be employed to monitor the flow rate of the fluid in the high pressure fluid line 135. For example, if the fluid flow rate through the high pressure fluid line 135 increases to a predetermined level, then one or more motors may be activated to accommodate the fluid flow rate increase. Similarly, if the fluid flow rate through the high pressure fluid line 135 decreases to a predetermined level, then one or more motors may be deactivated to accommodate the fluid flow rate decrease. Alternatively, the electronic control system may activate or deactivate motors according to the number of pumps that have been activated or deactivated.

By selectively switching motors between their bypass and operatively connected conditions and/or varying the displacement of a motor based on a change in fluid flow rate through the high pressure line 135, the torque applied to the second shaft 165 will change. An increase in torque applied to the second shaft 165 will increase the power output of the generator 120, while a decrease in torque applied to the second shaft 165 will decrease the power output of the generator 120. Where the generator 120 is a fixed speed generator, it is desirable to rotate the second shaft 165 at a constant speed. In this case, the motors 160a-d may be selectively activated or deactivated based on the fluid flow rate to maintain a constant rotation speed of the second shaft 165, while maximizing the torque on the second shaft 165. Alternatively, a variable speed generator may be employed, in which case, the motors 160a-d may be selectively activated or deactivated based on the fluid flow rate to vary both the rotation speed and torque on the second shaft 165. In such an embodiment, peak efficiency points may be identified, and the electronic control system may select the torque and rotation speed to maximize efficiency.

By having the capability to selectively activate the pumps and motors based on the torque applied to the first shaft 125 by the rotating rotor 110, the power transmission system 100 is capable of operating at an optimum overall efficiency. The optimum overall efficiency may be achieved by maximizing the number of pumps 130a-d and the number of motors 160a-d that are operating at full displacement.

One pump may be added or subtracted (or "activated or deactivated") from the hydraulic circuit at a time to accommodate changes to the torque of the first shaft 125. Alternatively, multiple pumps may be added or subtracted from the hydraulic circuit at the same time. Likewise, one motor may be added or subtracted (or "activated or deactivated") from the hydraulic circuit one by one to accommodate changes to the rate of the fluid flow in the high pressure fluid line 135, or multiple motors may be activated or deactivated at the same time. Switching multiple motors and pumps at the same time, or switching one pump or one motor at a time may both be referred to as switching the pumps and motors in a "piecewise manner." Switching in a piecewise manner may be done to control the overall efficiency of the transmission system 100.

The following examples are offered to describe the operation of the power transmission system 100 under certain conditions. In these examples, the power transmission system 100 includes the four pumps 130a-d shown in FIG. 1. Pump 130a is a variable displacement pump and is designated as the first pump. As such, it will be the first pump placed in an operatively connected state. The remaining pumps 130b-d are fixed displacement hydraulic pumps. While the first pump in this example is the pump closest to the rotor, it should be understood that any of the pumps 130a-d may be designated as the first pump.

Because there are four pumps 130a-d in the power transmission system 100 each having the same maximum displacement, each pump is configured to provide 25% of the maximum fluid flow when operated at 100% displacement. The fluid flow through the pumps 130a-d can be shown as a percentage of maximum fluid flow, according to the following equation:

$$0.25(PD_a)+0.25(PD_b)+0.25(PD_c)+0.25(PD_d)=F \quad \text{(Equation 1)}$$

where $PD_{a-d}$ is the percentage of full displacement of operation of pumps 130a-d and F is the percentage of maximum fluid flow. Each pump operates at its optimum efficiency when it operates at full displacement. Therefore, to optimize the efficiency of the entire system, the number of pumps operating at full displacement should be maximized, and no more than one pump should be operated at less than full displacement.

Similarly, in these examples the power transmission system 100 includes the four motors 160a-d shown in FIG. 1. Motor 160a is a variable displacement motor and is designated as the first motor. As such, it will be the first motor placed in an operatively connected state. The remaining motors 160b-d are fixed displacement motors. While the first motor in this example is the motor furthest from the generator 120, it should be understood that any of the motors 160a-d may be designated as the first motor.

Because there are four motors 160a-d in the power transmission system 100 each having the same maximum displacement, each motor is configured to provide 25% of the maximum fluid flow when operated at 100% displacement. The fluid flow can also be calculated as a percentage of maximum fluid flow according the following equation:

$$0.25(MD_a)+0.25(MD_b)+0.25(MD_c)+0.25(MD_d)=F \quad \text{(Equation 2)}$$

where $MD_{a-d}$ is the percentage of full displacement of operation of motors 160a-d and F is the percentage of maximum fluid flow. Each motor operates at its optimum efficiency when it operates at full displacement. Therefore, to optimize the efficiency of the entire system, the number of motors operating at full displacement should be maximized, and no more than one motor should be operated at less than full displacement

Example 1

In this example, wind rotates the rotor 110 and, consequently, the first shaft 125 with a first torque. Assume that, based on either a measured torque or a measured fluid pressure, the electronic control system determines that the conditions are sufficient to produce 10% of the maximum fluid flow.

To optimize the production of 10% of the maximum fluid flow through the system 100, under Equation 1, the first pump 130*a* would be placed in its operatively connected condition and set at 40% of full displacement, while the remaining pumps 130*b-d* would be kept in their bypass conditions (0% of full displacement).

Similarly, under Equation 2, the first motor 160*a* would be placed in an operatively connected condition and set at 40% of full displacement, while the remaining motors 160*b-d* would be kept in their bypass conditions (0% of full displacement).

Example 2

In this example, assume that, based on either a measured torque or a measured fluid pressure, the electronic control system determines that the conditions are sufficient to produce 40% of the maximum fluid flow.

To optimize the production of 40% of the maximum fluid flow through the system 100, under Equation 1, the first pump 130*a* would be placed in its operatively connected condition and set at 60% of full displacement and the second pump 130*b* would be placed in its operatively connected condition and set at 100% of full displacement, while the remaining pumps 130*c-d* would be kept in their bypass conditions (0% of full displacement).

Similarly, under Equation 2, the first motor 160*a* would be placed in its operatively connected condition and set at 60% of full displacement and the second motor 160*b* would be placed in its operatively connected condition and set at 100% of full displacement, while the remaining motors 160*c-d* would be kept in a bypass condition (0% of full displacement).

Example 3

In this example, assume that, based on either a measured torque or a measured fluid pressure, the electronic control system determines that the conditions are sufficient to produce 65% of the maximum fluid flow.

To optimize the production of 65% of the maximum fluid flow through the system 100, under Equation 1, the first pump 130*a* would be placed in its operatively connected condition and set at 60% of full displacement and the second pump 130*b* and third pump 130*c* would each be placed in its respective operatively connected condition and set at 100% of full displacement, while the fourth pump 130*d* would be kept in its bypass condition (0% of full displacement).

Similarly, under Equation 2, the first motor 160*a* would be placed in its operatively connected condition and set at 60% of full displacement and the second motor 160*b* and third motor 160*c* would each be placed in its respective operatively connected condition and set at 100% of full displacement, while the fourth motor 160*d* would be kept in its bypass condition (0% of full displacement).

Example 4

In this example, assume that, based on either a measured torque or a measured fluid pressure, the electronic control system determines that the conditions are sufficient to produce 95% of the maximum fluid flow.

To optimize the production of 95% of the maximum fluid flow through the system 100, under Equation 1, the first pump 130*a* would be placed in its operatively connected condition and set at 80% of full displacement, while the second, third, and fourth pumps 130*c-d* are placed in their operatively connected conditions at 100% of full displacement.

Similarly, under Equation 2, the first motor 160*a* would be placed in its operatively connected condition and set at 80% of full displacement, while the second, third, and fourth motors 160*b-d* are placed in their operatively connected conditions at 100% of full displacement.

Figure 2:
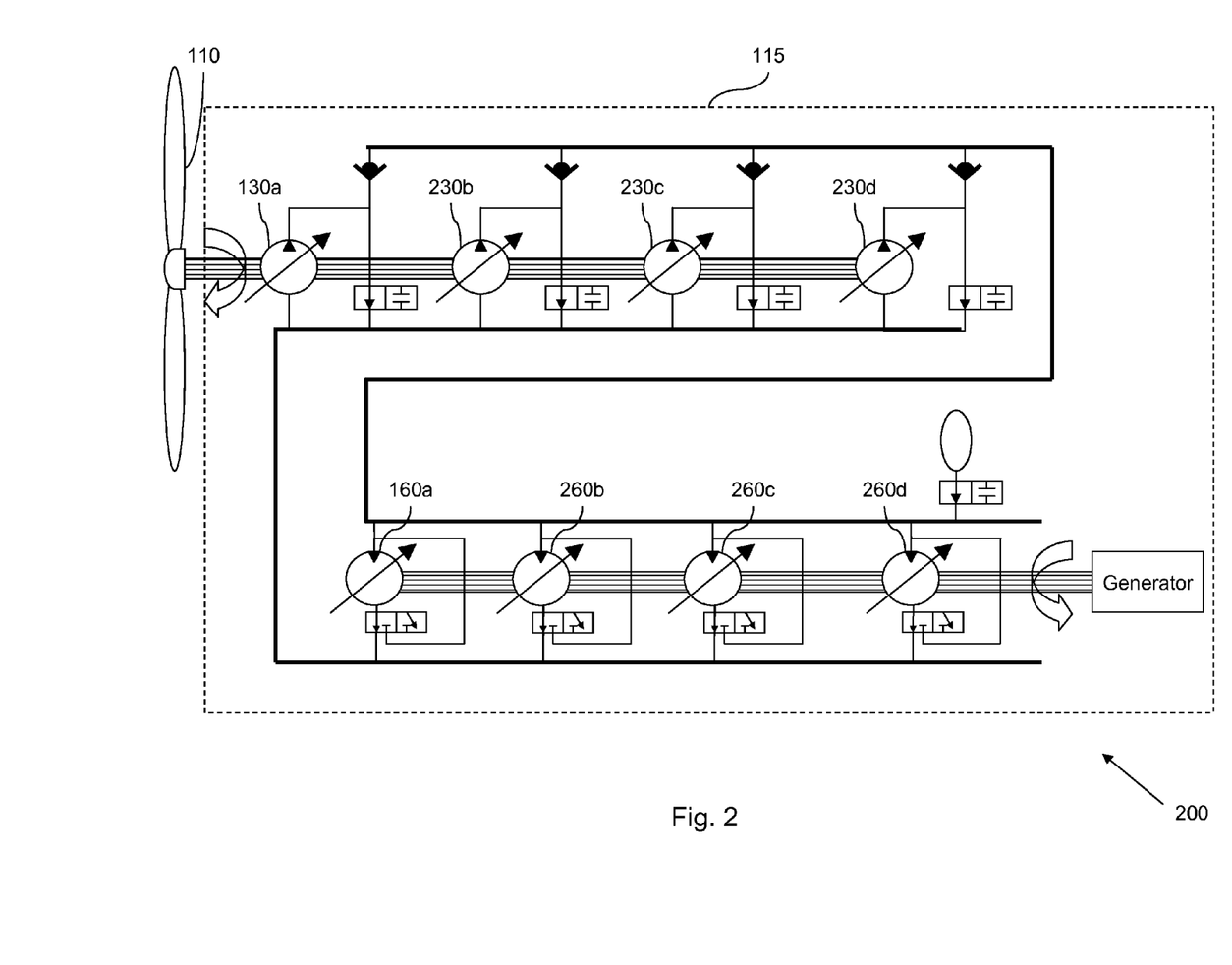
FIG. 2 is a schematic illustration of an alternative embodiment of a power transmission system 200 having multiple pumps and multiple motors.

FIG. 2 is a schematic illustration of an alternative embodiment of a power transmission system 200 that is substantially the same as the power transmission system 100, except for the differences discussed herein. Like reference numbers are used for like components.

In the power transmission system 200, each of the pumps 130*a*, 230*b-d* is a variable displacement pump. In this embodiment, the first pump 130*a* will again operate between 0-100% of full displacement. When the rotor 110 and first shaft 125 rotate with a low torque, the first pump 130*a* will be in an operatively connected state and each of the remaining pumps 230*b-d* will be in a bypass state. As the torque of the rotor 110 increases, the first pump 130*a* will be operated at an increasingly higher percentage of its full displacement.

When the first pump 130*a* reaches full displacement, a second pump, such as pump 230*b*, may be activated. In this embodiment, the first pump 130*a* will continue to operate at full displacement and the second pump 230*b* will operate between 0-100% of full displacement. If the torque of the rotor 110 increases, the second pump 230*b* will be operated at an increasingly higher percentage of its full displacement and the first pump 130*a* will remain at full displacement.

When the second pump 230*b* reaches full displacement, a third pump, such as pump 230*c*, may be activated. In this manner, additional pumps may be activated until every pump is in an operatively connected state and operating at full displacement. Similarly, as the rotor decreases its speed, pumps may be deactivated.

In the power transmission system 200, the order in which pumps are switched to an operatively connected state may be varied to prevent uneven wear of the pumps. For example, pump 130*a* may be designated as the first pump for a first period of time, pump 230*b* may be designated as the first pump for a second period of time, pump 230*c* may be designated as the first pump for a third period of time, and pump 230*d* may be designated as the first pump for a fourth period of time. The length of each period of time may be predetermined, or may be varied. For example, the usage of each pump may be monitored, and the length of each period of time may be selected according to the usage to date of each pump, or depending on an estimated remaining life of each pump.

Additionally, each of the motors 160*a*, 260*b-d* are variable displacement hydraulic motors. Although the power transmission system 200 employs only variable displacement motors and only variable displacement pumps, it should be understood that any combination of fixed and variable pumps and motors may be employed.

In the power transmission system 200, the first motor 160a will operate between 0-100% of full displacement. When the fluid in high pressure fluid line 135 flows at a low rate, the first motor 160a will be in an operatively connected state and the remaining motors 260b-d will be in a bypass state. As the flow rate of the fluid increases, the first motor 160a will be operated at an increasingly higher percentage of its full displacement.

When the first motor 160a reaches full displacement, a second motor, such as motor 260b, may be switched from a bypass state to an operatively connected state. In this embodiment, the first motor 160a will continue to operate at full displacement and the second motor 160b will operate between 0-100% of full displacement. If the flow rate of the fluid increases, the second motor 260b will be operated at an increasingly higher percentage of its full displacement and the first motor 160a will remain at full displacement.

When the second motor 260b reaches full displacement, a third motor, such as motor 260c, may be switched from a bypass state to an operatively connected state. In this manner, motors may be switched from a bypass state to an operatively connected state until every motor is in an operatively connected state and operating at full displacement. Similarly, as the rotor decreases its speed, motors may be switched from an operatively connected states to a bypass states.

In the power transmission system 200, the order in which motors are switched to an operatively connected state may be varied to prevent uneven wear of the motors. For example, motor 160a may be designated as the first motor for a first period of time, motor 260b may be designated as the first motor for a second period of time, motor 260c may be designated as the first motor for a third period of time, and motor 260d may be designated as the first motor for a fourth period of time. The length of each period of time may be predetermined, or may be varied. For example, the usage of each motor may be monitored, and the length of each period of time may be selected according to the usage to date of each motor.

Figure 3:
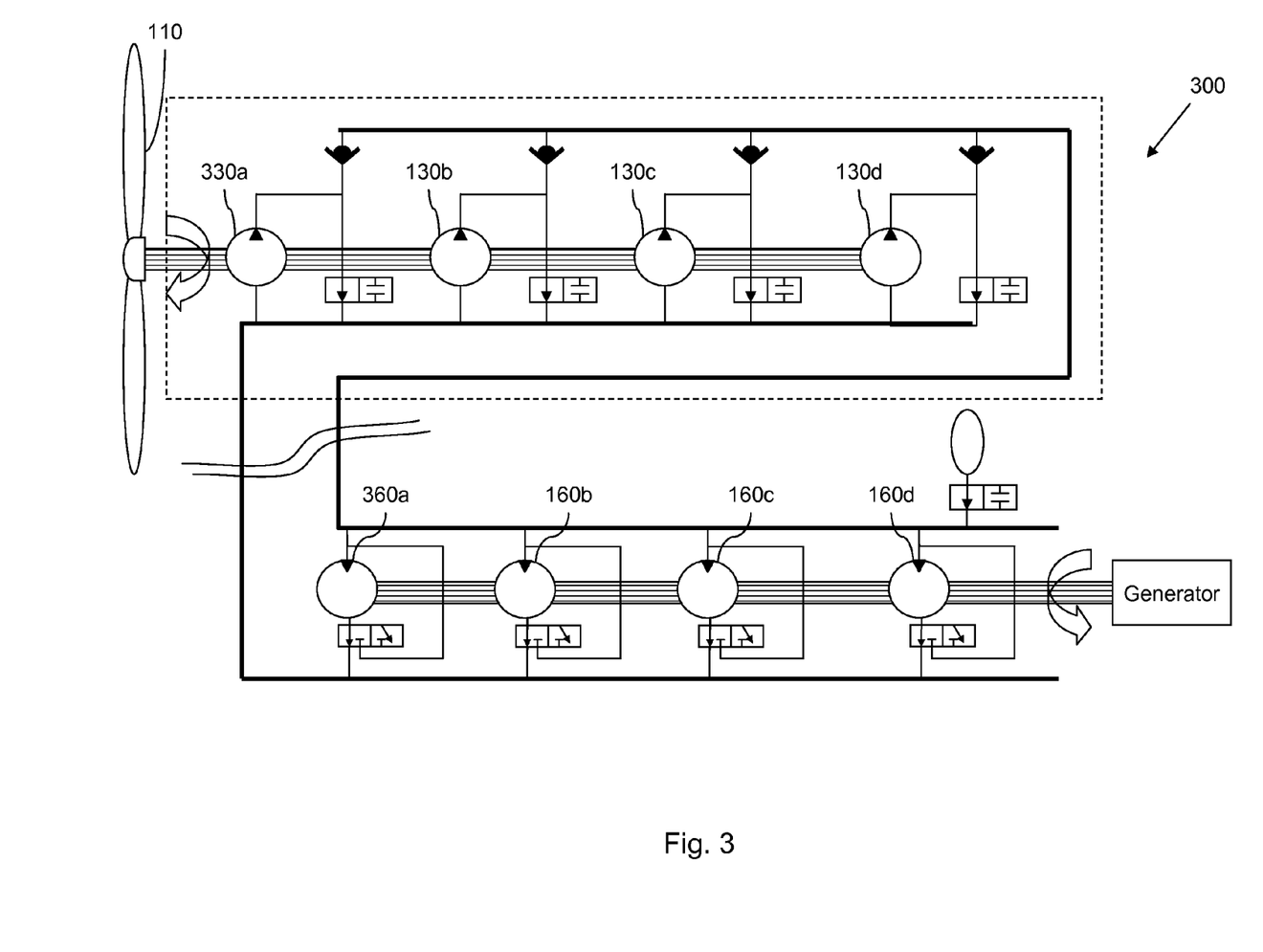
FIG. 3 is a schematic illustration of another alternative embodiment of a power transmission system 300 having multiple pumps and multiple motors.

FIG. 3 is a schematic illustration of another alternative embodiment of a transmission system 300 that is substantially the same as the transmission system 100, except for the differences discussed herein. Like reference numbers are used for like components.

In the transmission system 300, each of the pumps 330a, 130b-d is a fixed displacement pump. In this embodiment, when the rotor 110 rotates with a low torque, the first pump 330a will be in an operatively connected state and operate at full displacement. Each of the remaining pumps 130b-d will be in a bypass state. When the torque of rotor 110 increases, a second pump, such as pump 130b, will be switched from a bypass state to an operatively connected state. Additional pumps may be switched according to the torque of the rotor 110. This may be done with pulse width modulation, through the use of digital hydraulic valves.

In the power transmission system 300, the order in which pumps are switched to an operatively connected state may be varied to prevent uneven wear of the pumps. For example, pump 330a may be designated as the first pump for a first period of time, pump 130b may be designated as the first pump for a second period of time, pump 130c may be designated as the first pump for a third period of time, and pump 130d may be designated as the first pump for a fourth period of time. The length of each period of time may be predetermined, or may be varied. For example, the usage of each pump may be monitored, and the length of each period of time may be selected according to the usage to date of each pump, or depending on an estimated remaining life of each pump.

Further, each of the motors 360a, 160b-d are fixed displacement hydraulic motors. Although power transmission system 300 employs only fixed displacement motors and only fixed displacement pumps, it should be understood that any combination of fixed and variable pumps and motors may be employed.

In the power transmission system 300, when the fluid in high pressure fluid line 135 flows at a low rate, the first motor 360a will be in an operatively connected state and operate at full displacement. The remaining motors 160b-d will be in a bypass state. When the flow rate of the fluid increases, a second motor, such as motor 160b, will be switched from a bypass state to an operatively connected state. Additional motors may be switched according to the speed of the rotor 110.

Figure 4:
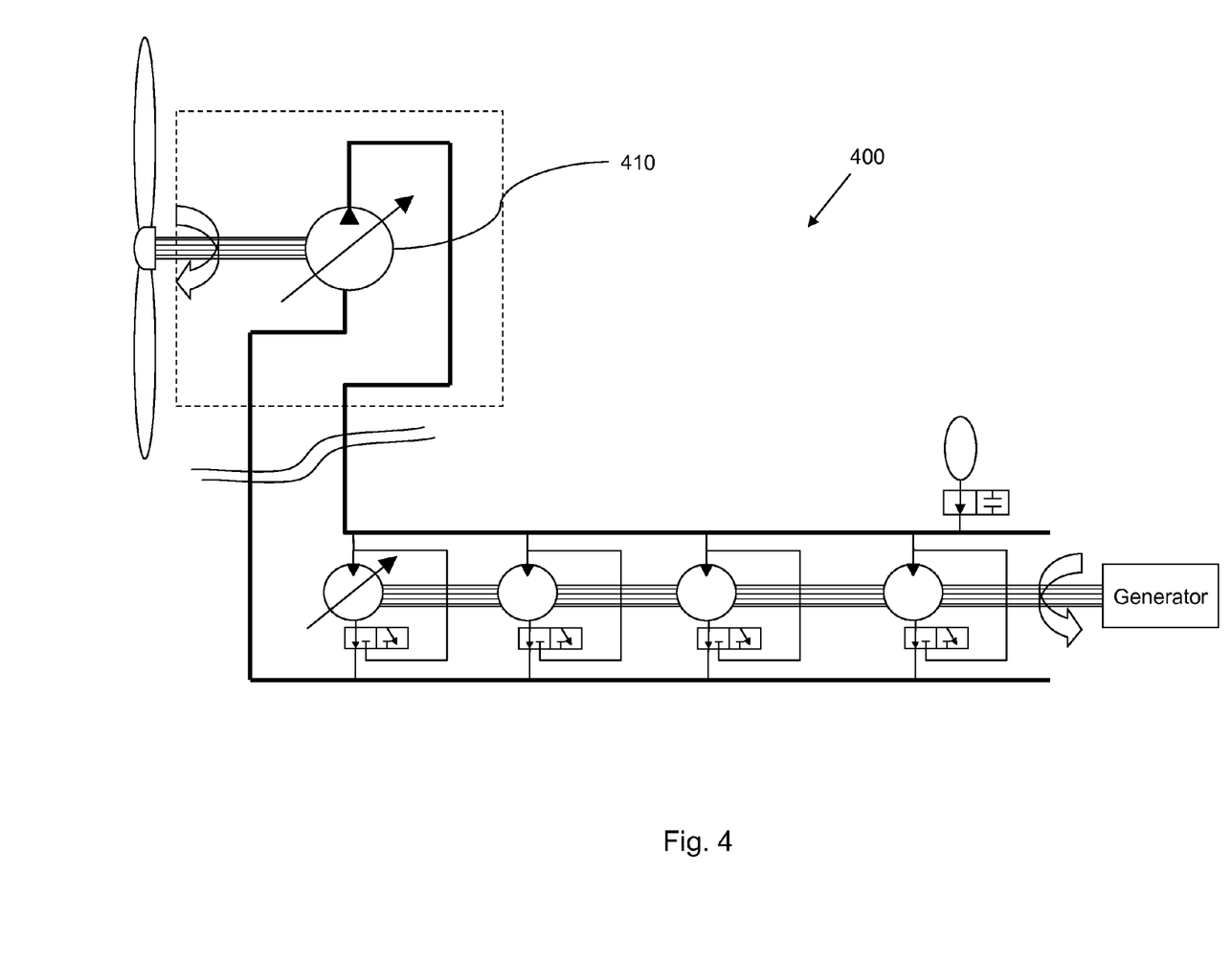
FIG. 4 is a schematic illustration of one embodiment of a power transmission system 400 having a single pump and multiple motors.

FIG. 4 is a schematic illustration of an alternative embodiment of a power transmission system 400. The power transmission system 400 is substantially the same as the power transmission system 100 illustrated in FIG. 1 and described above, except that the plurality of pumps 130a-d, check valves 145a-d, pump bypass lines 150a-d, and pump control valves 155a-d are replaced by a single pump 410. In the illustrated embodiment, the single pump 410 is a variable displacement hydraulic pump. In an alternative embodiment, the single pump 410 is a fixed displacement hydraulic pump.

Figure 5:
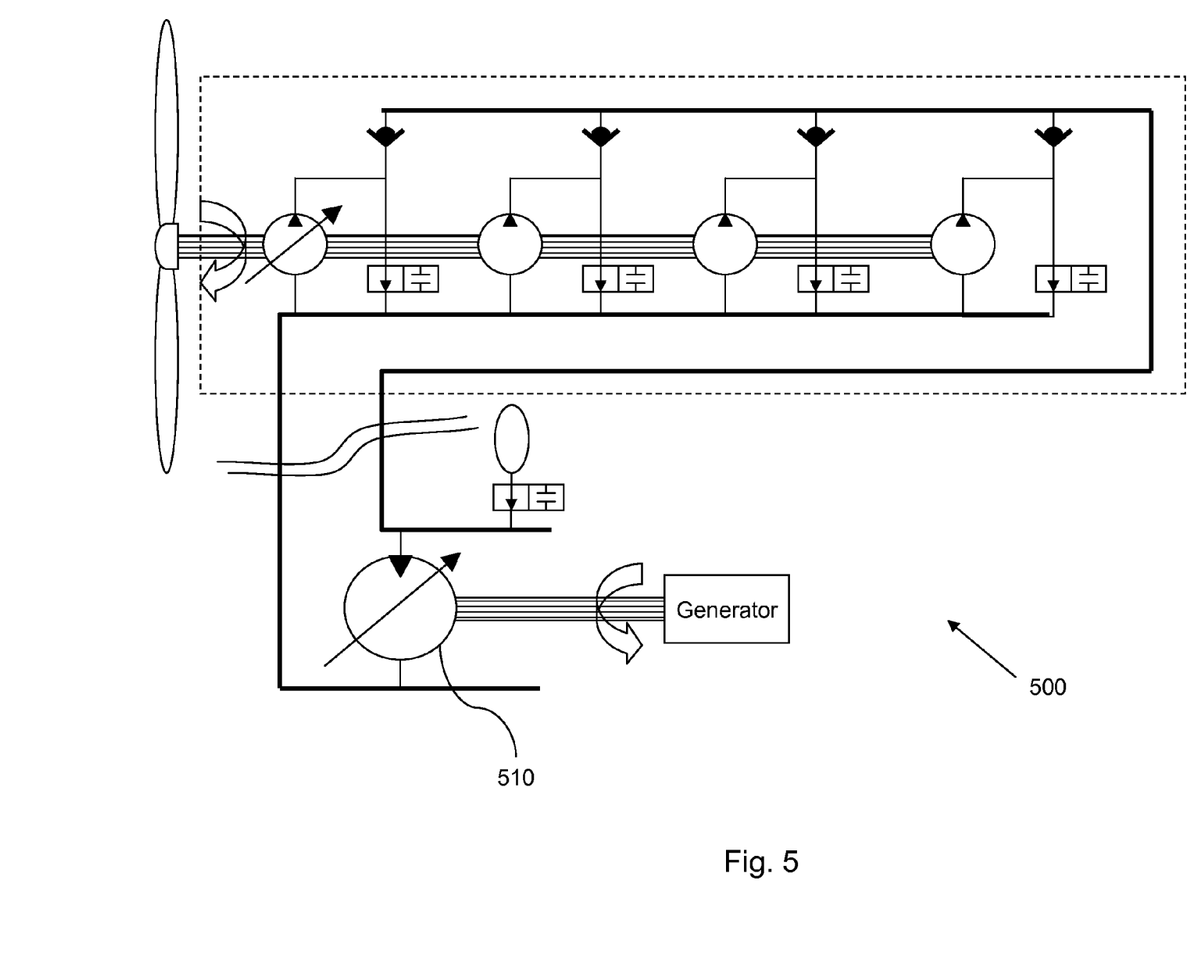
FIG. 5 is a schematic illustration of one embodiment of a power transmission system 500 having multiple pumps and a single motor.

FIG. 5 is a schematic illustration of an alternative embodiment of a power transmission system 500. The power transmission system 500 is substantially the same as the power transmission system 100 illustrated in FIG. 1 and described above, except that the plurality of motors 160a-d, motor bypass lines 170a-d, and motor control valves 175a-d are replaced by a single motor 510. In the illustrated embodiment, the single motor 510 is a variable displacement hydraulic motor. In an alternative embodiment, the single motor 510 is a fixed displacement hydraulic motor.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A wind turbine comprising:
   a rotor;

a plurality of positive displacement hydraulic pumps operatively connected to the rotor;

a plurality of positive displacement hydraulic motors;

a plurality of fluid lines operatively connecting at least one of the positive displacement hydraulic pumps to the at least one positive displacement hydraulic motor;

a plurality of control valves, each of which is associated with one of the positive displacement hydraulic pumps, wherein each control valve is configured to switch an associated pump between an operatively connected state and a bypass state, the control valves configured to operate such that multiple pumps may concurrently be in the operatively connected state;

a plurality of motor bypass valves, each of which is associated with one of the positive displacement hydraulic motors, wherein each motor bypass valve is configured to switch an associated motor between an operatively connected state and a bypass state, the motor bypass valves configured to operate such that multiple motors may concurrently be in the operatively connected state; and an electronic controller configured to selectively switch the pumps and the motors between their operatively connected and bypass states in response to a change in a measured condition, such that no more than one of the motors operates below full displacement at a given time.

2. The wind turbine of claim 1, wherein at least one of the positive displacement hydraulic pumps is a variable displacement pump.

3. The wind turbine of claim 1, wherein the measured condition is one of a measured torque and a measured fluid pressure.

4. The wind turbine of claim 1, wherein the at least one positive displacement hydraulic motor includes a plurality of positive displacement hydraulic motors.

5. The wind turbine of claim 1, further comprising a nacelle, wherein the positive displacement hydraulic pumps are located in the nacelle.

6. The wind turbine of claim 1, further comprising a nacelle, wherein the at least one positive displacement hydraulic motor is located distal from the nacelle.

7. The wind turbine of claim 1, wherein the control valves are configured such that, when each operatively connected positive displacement hydraulic pump is operating at full displacement, an additional positive displacement pump is switched from a bypass state to an operatively connected state.

8. The wind turbine of claim 1, wherein the electronic controller is configured to alternate pumps in the operatively connected state to extend the life of each pump, and further configured to place malfunctioning pumps in a non-operational state.

9. The wind turbine of claim 8, further comprising a nacelle having at least one access port proximal to at least one of the plurality of positive displacement hydraulic pumps, the access port having dimensions larger than dimensions of the at least one of the plurality of positive displacement hydraulic pumps.

10. A method of operating a hydraulic circuit having an input shaft, at least one positive displacement hydraulic pump, a plurality of positive displacement hydraulic motors, and at least one fluid line operatively connecting the at least one positive displacement hydraulic pump to the positive displacement hydraulic motors, the method comprising:

placing the at least one positive displacement hydraulic pump in an operative condition;

placing at least one of the positive displacement hydraulic motors in an operative condition;

measuring a flow rate of fluid in the fluid line; and switching the remaining positive displacement hydraulic motors between an operative condition and a bypass condition in a piecewise manner according to the measured flow rate of the fluid, such that no more than one of the positive displacement hydraulic motors operates below full displacement at a given time.

11. The method of claim 10, wherein the at least one positive displacement hydraulic pump includes a plurality of positive displacement hydraulic pumps.

12. The method of claim 11, further comprising measuring a torque on the input shaft and switching the plurality of positive displacement hydraulic pumps between an operative condition and a bypass condition in a piecewise manner according to the measured torque.

13. The method of claim 11, further comprising measuring a fluid pressure of the fluid line and switching the plurality of positive displacement hydraulic pumps between an operative condition and a bypass condition in a piecewise manner according to the measured fluid pressure.

14. The method of claim 10, further comprising alternating motors in the operatively connected state to extend the life of each motor.

15. The method of claim 10, further comprising smoothing the flow rate of the fluid in the fluid line.

16. A power transmission system comprising:

a plurality of positive displacement hydraulic pumps, each having a control valve associated therewith configured to switch the associated pump between an operative state and a bypass state;

a plurality of positive displacement hydraulic motors each having a motor bypass valve associated therewith configured to switch the associated motor between an operative state and a bypass state; and at least one fluid line fluidly connecting the pumps to the motors, wherein the power transmission system is configured to switch the control valves such that no more than one of the pumps and no more than one of the motors operates below full displacement at a given time.

17. The power transmission system of claim 16, wherein at least one of the positive displacement hydraulic pumps is a variable displacement pump.

18. The power transmission system of claim 16, wherein at least one of the positive displacement hydraulic motors is a variable displacement motor.

19. The power transmission system of claim 16, further comprising an accumulator.

20. The power transmission system of claim 16, further comprising an electronic controller configured to alternate pumps in the operative state to extend the life of each pump, place malfunctioning pumps in a non-operational state, alternate motors in the operative state to extend the life of each motor, and place malfunctioning motors in a non-operational state.

* * * * *